United States Patent [19]

Loyless

[11] 4,010,017
[45] Mar. 1, 1977

[54] RECOVERY OF HYDROGEN CHLORIDE FROM CHLORINATED HYDROCARBONS SUCH AS CHLOROMETHANES

[75] Inventor: James E. Loyless, Baton Rouge, La.

[73] Assignee: Vulcan Materials Company, Birmingham, Ala.

[22] Filed: Apr. 15, 1975

[21] Appl. No.: 568,242

[52] U.S. Cl. .................................. 62/28; 62/23; 260/652 P; 423/240

[51] Int. Cl.² ........................ F25J 3/02; F25J 3/06; C07C 19/00; C01B 7/00

[58] Field of Search ............... 423/240; 260/652 P; 62/11, 23, 24, 27, 28

[56] References Cited

UNITED STATES PATENTS

| | | | |
|---|---|---|---|
| 2,472,610 | 6/1949 | Nixon et al. | 62/23 |
| 2,490,454 | 12/1949 | Myers | 62/23 |
| 3,260,059 | 7/1966 | Rosenberg et al. | 62/28 |

*Primary Examiner*—Jack Sofer
*Attorney, Agent, or Firm*—Burns, Doane, Swecker & Mathis

[57] ABSTRACT

High purity hydrogen chloride is recovered from a gaseous product stream consisting essentially of hydrogen chloride and at least one chlorinated hydrocarbon of from one to two carbon atoms, such as the chloromethanes, by a process which has significantly lowered refrigeration requirements, thus resulting in savings of energy and materials. The process involves (a) condensing essentially all of the gaseous stream to form a liquid phase feed stream wherein the liquid phase consists essentially of the hydrogen chloride and the chlorinated hydrocarbon(s); (b) passing the condensed liquid phase feed stream to a stripping zone; (c) maintaining the stripping zone at a pressure and temperature profile sufficient to retain essentially all of the chlorinated hydrocarbon(s) in a liquid phase and to allow essentially all of the hydrogen chloride to separate in a vapor phase; (d) removing a first recovery stream consisting of the high purity hydrogen chloride vapor phase from the stripping zone; and (e) removing a second recovery stream consisting of the chlorinated hydrocarbon(s) liquid phase from the stripping zone. In a preferred embodiment the gaseous product stream is from a methyl chloride thermal chlorinator and consists essentially of hydrogen chloride and a chloromethane mixture, this gaseous product stream is completely condensed and cooled to a temperature between about −30° C and about −10° C and then fed to the stripping zone which is maintained at a pressure between about 200 psia and about 250 psia.

7 Claims, 1 Drawing Figure

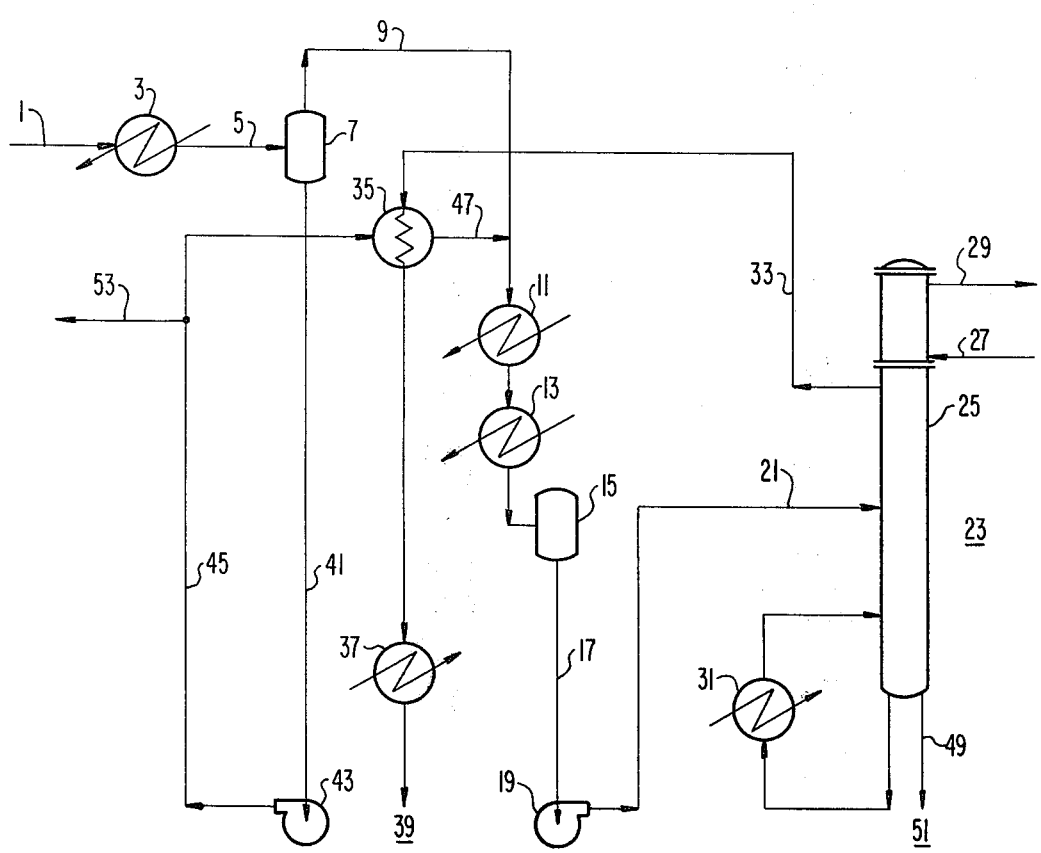

RECOVERY OF HYDROGEN CHLORIDE FROM CHLORINATED HYDROCARBONS SUCH AS CHLOROMETHANES

BACKGROUND OF THE INVENTION

1. Field of the Invention

This invention relates to improvements in the recovery of hydrogen chloride from gaseous product streams containing chlorinated hydrocarbons such as chloromethanes.

2. Summary of the Prior Art

Hydrogen chloride as a gas and in aqueous solution as hydrochloric acid are commercially valuable products which may have a variety of uses including the production of chlorinated organics, e.g., hydrochlorination of methanol to form methyl chloride, and other chlorination, polymerization, isomerization, alkylation and nitration reactions; production of food products, e.g., corn syrup and sodium glutamate; in the metals industry, e.g., pickling and metal cleaning; in the petroleum industry, e.g., acidizing of formations; and other miscellaneous end uses such as industrial cleaning of equipment.

Hydrogen chloride and hydrochloric acid may be produced by several different routes, including as a by-product in organic syntheses such as the thermal chlorination of methyl chloride to form more highly chlorinated methanes, e.g., methylene chloride, chloroform and carbon tetrachloride. The organic syntheses route, however, results in a substantially dry gaseous stream containing hydrogen chloride and organics, and common practice is to separate the hydrogen chloride from the organics by partially condensing the gaseous stream at essentially atmospheric pressures, which commonly requires large amounts of refrigeration involving the use of liquefied gases such as liquid ethylene at low temperatures, for example, of from $-50°$ to $-85°$ C.

The need to use such low temperature refrigeration necessarily entails correspondingly high energy consumption. Further, the use of such low temperature refrigeration may necessitate "defrosting," insofar as ice and frozen hydrogen chloride hydrates accumulate on the equipment which interferes with its normal operation and which may also cause increased corrosion problems due to accumulation of such ice along with some hydrogen chloride. Such "defrosting" operations typically entail a complete shutdown of the condenser equipment and removal of frozen material from the unit, and may also lead to certain losses in product yields.

SUMMARY OF THE OBJECTS AND ASPECTS OF THE INVENTION

Accordingly, a primary object of the present invention is to provide improvements in the recovery of hydrogen chloride from gaseous product streams containing chlorinated hydrocarbons such as chloromethanes and which improvements prevent or substantially alleviate the above-discussed problems of the prior art.

A more specific object of the present invention is to provide a process for the recovery of hydrogen chloride from a gaseous stream consisting essentially of hydrogen chloride and at least one chlorinated hydrocarbon of from one to two carbon atoms, which process substantially lessens refrigeration or cooling requirements.

A further object of the present invention is to provide a process for the recovery of high purity hydrogen chloride uncontaminated by organics and which process involves lessened energy consumption and material usage in the recovery system.

Another object of the present invention is to provide a process for the recovery of high purity hydrogen chloride from gaseous product streams containing chlorinated hydrocarbons such as chloromethanes and which process does not incur or which has substantially alleviated ice and hydrogen chloride hydrate build-up and concomitant corrosion conditions, and which does not require "defrosting."

Another object of the present invention is to provide a process for the recovery of hydrogen chloride-free chlorinated hydrocarbons, such as chloromethanes, which process possesses the advantages discussed herein.

Other objects and advantages of the present invention will become apparent to one skilled in the art from the following summary of the aspects of the invention.

In accordance with one aspect of the present invention, an improved process is provided for the recovery of hydrogen chloride from a gaseous stream or composition consisting essentially of hydrogen chloride and at least one chlorinated hydrocarbon of from one to two carbon atoms. This improvement involves (a) condensing all or essentially all of the gaseous stream to form a liquid phase feed stream or composition wherein the liquid phase consists essentially of the hydrogen chloride and the chlorinated hydrocarbon(s); (b) passing or feeding the condensed liquid phase feed stream to a stripping or fraction zone; (c) maintaining the stripping zone at a pressure and temperature profile or condition sufficient to retain all or essentially all of the chlorinated hydrocarbon(s) in a liquid phase and to allow all or essentially all of the hydrogen chloride to vaporize and separate in a vapor phase; (d) removing or taking a first recovery stream consisting of the high purity hydrogen chloride vapor phase from the stripping zone; and (e) removing or taking a second recovery stream consisting of the hydrogen chloride-free chlorinated hydrocarbon(s) liquid phase from the stripping zone.

In a more particular aspect of the present invention, a process is provided for the recovery of hydrogen chloride from a gaseous product stream coming from a methyl chloride thermal chlorinator unit. This gaseous product stream consists essentially of hydrogen chloride and a chloromethanes mixture consisting of methyl chloride, methylene chloride, chloroform and carbon tetrachloride. The process involves (a) condensing all or essentially all of the gaseous product stream to form a liquid phase feed stream wherein the liquid phase consists essentially of the hydrogen chloride and the chloromethanes; (b) passing the condensed liquid phase feed stream at a temperature between about $-30°$ C and about $-10°$ C and at a pressure between about 200 psia and 250 psia to a stripping zone; (c) maintaining the stripping zone at a pressure between about 200 psia and about 250 psia and at a temperature profile sufficient to retain essentially all of the chloromethanes in a liquid phase and to allow essentially all of the hydrogen chloride to separate in a vapor phase; (d) removing a first recovery stream consisting of the hydrogen chloride vapor phase from the stripping zone; and (e) removing a second recovery stream consisting of the chloromethanes liquid phase from the stripping zone.

A primary advantage of the present invention lies in condensing the entire or substantially entire gaseous stream and passing the entirely liquid phase feed stream to the stripping zone, as opposed to condensing only a portion of the gaseous stream to form a combined liquid-vapor stream for feeding to the stripping zone as previously suggested. This allows the stripping zone to be maintained at a higher operating pressure, e.g., above about 200 psia, and which in turn eliminates the need for low refrigeration requirements for the stripper or fractionator unit, thus resulting in savings in energy and materials. This higher temperature level refrigeration or cooling in turn eliminates or substantially prevents any ice and hydrogen chloride hydrate buildup and eliminates any frequent "defrosting" of the stripper unit. Elimination of any "defrosting" operations and necessary shutdown of the condenser system allows for maintenance of high product yields and savings in maintenance costs. Moreover, any corrosion conditions which exist during ice and hydrogen chloride buildup are eliminated entirely or substantially prevented. Further, all of this is achieved with the concurrent production of a high purity hydrogen chloride uncontaminated by organics as well as hydrogen chloride-free chlorinated hydrocarbon recovery.

BRIEF DESCRIPTION OF THE DRAWING

The FIGURE is a schematic flow diagram representative of the preferred embodiment of the recovery process of the present invention.

DESCRIPTION OF THE PREFERRED EMBODIMENTS

The present invention may be broadly applicable to the recovery of hydrogen chloride from a chlorinated hydrocarbon-containing gaseous stream regardless of source, and more specifically may be applicable to the recovery of hydrogen chloride from a gaseous stream consisting essentially of hydrogen chloride and at least one chlorinated hydrocarbon of from one to two carbon atoms. Preferably, the recovery process of the present invention is applied to the recovery of hydrogen chloride from a gaseous stream consisting essentially of hydrogen chloride and a mixture of chloromethanes. Such a gaseous product stream may be from a methyl chloride thermal chlorinator which typically produces a chloromethanes mixture consisting essentially of methyl chloride, methylene chloride, chloroform and carbon tetrachloride.

For example, the gaseous streams may contain from about 5 to about 30%, and more typically from about 12 to 20% hydrogen chloride; from about 1% to about 70%, and more typically from about 20% to about 60% methyl chloride; from about 1% to about 50%, and more typically from about 20% to about 30% methylene chloride; from about 1% to about 40% and more typically from about 5% to about 15% chloroflorm; and from about 1% to about 80% and more typically from about 1% to about 25% carbon tetrachloride. A minor amount, e.g., from about 0.03% to about 1% and more typically from about 0.05 to about 0.15% of other materials commonly referred to as "heavy ends," may also be present in the gaseous stream.

Other hydrogen chloride-containing gaseous streams which may be treated in accordance with the present invention may include, for example, other chlorinated hydrocarbons such as trichloroethylene, perchloroethylene, 1,2-dichloroethane, sym-tetrachloroethane, and vinyl chloride.

The thermal chlorination of methyl chloride with chlorine to form more highly chlorinated methanes is per se well known and not a part of the present invention. See, for example, "Chlorine, its Manufacture, Properties and Uses," J. S. Sconce, Reinhold Publishing Corp., New York, N.Y. (1962), and the references cited therein, particularly at pages 368–374, all of which are incorporated herein by reference for purposes of clarity of the present invention.

Methyl chloride together with chlorine is typically thermally chlorinated at considerably elevated temperatures, e.g., up to about 500° C, and more typically between about 400° C and about 450° C. Reactor effluent is thereafter typically quenched to lower the temperature of the gaseous stream, the lowered temperature still being sufficient at the pressures involved to maintain the effluent in a gaseous phase. For example, quenching may typically lower temperatures to below about 150° C, and more typically between about 50° C and about 100° C. Any convenient reaction effluent pressure may be used, including subatmospheric, atmospheric and preferably in accordance with the present invention superatmospheric pressures from, for example, about 20 psia to about 100 psia.

As indicated above, these gaseous streams are then treated in accordance with the present invention to recover high purity hydrogen chloride by a procedure which involves condensing all or essentially all of the gaseous stream to form a liquid phase feed stream wherein the liquid phase consists essentially of the hydrogen chloride and the chlorinated hydrocarbon such as the chloromethanes mixture. This condensing to a liquid phase feed stream is typically accomplished by cooling the gaseous stream to a temperature below the initial boiling point for the gaseous stream but above the temperature at which freezing or solid state transition begins. For example, in the case of chloromethanes, the gaseous stream is totally condensed by cooling to a temperature below about 0° C, but above the freezing point of the liquid phase material, and preferably between about −30° C and about −10° C. Any convenient pressure which is sufficient to keep the feed stream in liquid phase may be used. For example, pressures from about 20 psia to about 500 psia, and more typically from about 50 psia to about 150 psia, may be used during condensation.

The condensed liquid phase feed stream is then passed or fed to a stripping or fractionation zone. This stripping or fractioning zone is maintained at a pressure and temperature profile, i.e., set of operating pressures and temperatures, sufficient to retain all or essentially all of the chlorinated hydrocarbon or chloromethanes in a liquid phase and to allow all or essentially all of the hydrogen chloride to volatilize or separate in a vapor phase.

For example, the stripping zone may be maintained at a pressure of above about 150 psia, and more typically from about 200 psia to about 500 psia, and preferably from about 200 psia to about 250 psia.

In a conventional stripper or fractionating tower, the temperature profile may be, for example, at the top from about −30° C to about 15° C, more typically from about −20° C to about −10° C, at the middle and from about 0° C to about 100° C, and more typically from about 10° C to about 30° C; and at the bottom from about 60° C to about 200° C, and more typically from about 80° C to about 120° C.

The lower temperature in the upper end of the stripper or fractionating tower may be maintained by supplying a suitable coolant such as fluorocarbon, ammonia or chilled water at temperatures, for example, between about −40° C and about 10° C and more typically between about −30° C and about −10° C, which coolant is passed into indirect heat exchange contact with the material within the stripper unit so as to maintain the desired temperature profile. The elevated temperatures at the lower end of the stripper or fractionating unit may be conventionally maintained such as by a steam reboiler.

The actual stripper or fractionating unit utilized may be any conventional equipment known to those skilled in this art, and the detailed operation of this will also be evident to those skilled in this art in view of the present specification. See also "Perry's Chemical Engineers' Handbook," Perry et al., Fourth Edition, McGraw-Hill Book Company, Inc., New York, N.Y. (1963), and particularly Chapter 14 thereof, and which is incorporated herein by reference for purposes of clarity of the present invention.

The high purity hydrogen chloride vapor phase is typically recovered by removing a product stream near the upper portion of the stripper unit. The hydrogen chloride recovered in accordance with the present invention may, depending on the desired end use, contain a very small amount of organic contaminant, e.g., up to about 500 ppm organic contaminant, and typically less than about a trace amount, e.g., 50 ppm. The hydrogen chloride may be used directly in the vapor phase for a variety of end uses including, for example, the hydrochlorination of methanol to form methyl chloride or the oxychlorination of ethane to form ethylene dichloride. The hydrogen chloride may also be absorbed in water to form hydrochloric acid of a very high quality.

The hydrogen chloride-free chlorinated hydrocarbon liquid phase may be removed from the stripping zone near the lower portion of the stripper unit and thereafter further processed as desired. Depending upon desired end use, the chlorinated hydrocarbon liquid phase may contain a very small amount of hydrogen chloride, e.g., up to about 5,000 ppm, and typically a trace amount, e.g., between about 100 ppm and 1,000 ppm. In the case of chloromethanes, typically products would include methylene chloride, chloroform and carbon tetrachloride, and the methyl chloride component of the chloromethanes mixture would be recycled to the thermal chlorination reactor.

The present invention is further illustrated by the following example when read in conjunction with the accompanying FIGURE. It should be understood that the present invention is illustrated but not limited by the specific details of this example wherein, as in other parts of the specification and the claims, all parts and percentages are by weight unless otherwise specified.

EXAMPLE

This example illustrates the recovery of high purity hydrogen chloride from a methyl chloride thermal chlorinator gaseous product stream consisting essentially of hydrogen chloride and a chloromethanes mixture consisting essentially of methyl chloride, methylene chloride, chloroform and carbon tetrachloride.

Referring to the drawing, a gaseous product stream from a methyl chloride thermal chlorinator (not shown) and subsequent quench zone (not shown) is passed through a line or conduit 1. This gaseous product stream is at a pressure of about 78 psia and a temperature of about 73° C and contains a vapor which is composed of about 6,270 parts by weight hydrogen chloride, about 35,000 parts by weight methyl chloride, about 29,500 parts by weight methylene chloride, about 10,400 parts by weight chloroform, about 1,370 parts by weight carbon tetrachloride and about 50 parts by weight of other higher molecular weight chlorinated organics as a heavy ends portion. The gaseous stream is passed through line 1 to a water cooled heat exchanger 3 and then through a line 5 to a reflux drum 7. From the reflux drum the gaseous material at a pressure of 78 psia and a temperature of about 43° C is passed through a line 9 to a heat exchanger 11 and then to another heat exchanger 13 wherein the coolant is R500 fluorocarbon mixture entering at a temperature of −30° C. After passing through the heat exchanger 13 the gaseous stream has been condensed by cooling to a temperature of about −18° C, and the pressure is 78 psia, and the stream at this point is entirely in the liquid phase which consists essentially of the hydrogen chloride and the chloromethanes. After leaving the heat exchanger 13 the liquid phase feed stream is passed to a feed drum 15 and then through a line 17 to a pump 19. The condensed liquid phase feed stream is then pumped at a pressure of about 235 psia to a stripping zone 23. The stripping zone 23 is composed of a stripper 25 which is at a pressure of about 235 psia and is cooled at its upper end by a R500 fluorocarbon mixture coolant which enters the stripping zone 23 via a line 27 at a temperature of −20° C and is withdrawn from the stripping zone 23 via a line 29. The stripper 25 is a conventional Monel shell unit having a 3 foot ID and a 47 foot height with 30 Monel trays, and is fitted with a steam reboiler unit 31 which is adjusted to give a temperature of about 105° C in the lower portion and about 25° C in the middle portion of the stripper unit. A recovery stream consisting of 5950 parts by weight of hydrogen chloride in the vapor phase is removed from the stripper zone 23 via an off-take line 33 at a temperature of about −15° C and is then passed through a heat exchanger 35 and yet another water cooled heat exchanger 37 and is sent to a recovery zone 39 at a temperature of about 10° C. Also, from the reflux drum 7, a liquid phase portion of the feed stream which portion contains about 65 parts by weight hydrogen chloride, 1,970 parts by weight methyl chloride, 3,980 parts by weight methylene chloride, 1,540 parts by weight chloroform and 225 parts by weight carbon tetrachloride are passed via a line 41 to a pump 43 and is thereafter passed via a line 45 to the heat exchanger 35 and into indirect heat exchange contact with the hydrogen chloride product in line 33, and thereafter is passed via a line 47 into admixture with the gaseous stream in line 9. A second recovery stream consisting of the chloromethanes liquid phase is removed from the stripping zone 23 via a line 49 at a temperature of about 105° C and is passed to a recovery zone 51. This chloromethanes liquid phase is essentially hydrogen-chloride free and contains about 25,000 parts methyl chloride, 9,500 parts methylene chloride, 2,700 parts chloroform, 270 parts carbon tetrachloride and 10 parts of the heavy ends residue. Additional chloromethanes mixture comprised of about 300 parts hydrogen chloride, 20,000 parts methylene chloride, 7,700 parts chloroform, 1,100 parts carbon tetrachloride and 40 parts heavy ends residue is removed from line 45 via a line 53 and is passed to the thermal chlorinator quench zone (not shown).

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

I claim:

1. In a process for the recovery of hydrogen chloride from a gaseous stream consisting essentially of from about five to about 30% hydrogen chloride and correspondingly from about 95% to about 70% of a mixture of chloromethanes, the improvement which comprises the following steps:
   a. in a first zone cooling the gaseous stream to form a first gaseous phase portion and a first liquid phase portion;
   b. passing the first gaseous phase portion and the first liquid phase portion from the first zone to a second zone and in the second zone separating the first gaseous phase portion from the first liquid phase portion;
   c. passing the first liquid phase portion from the second zone to a third zone and in the third zone cooling the first liquid phase portion by passing the first liquid phase portion into indirect heat exchange relationship with a hydrogen chloride product recovery stream;
   d. passing the first liquid phase portion after cooling from the third zone to a fourth zone and admixing the cooled first liquid phase portion with the first gaseous phase portion to form an admixed gaseous phase portion/liquid phase portion stream;
   e. passing the admixed stream from the fourth zone to a fifth zone and condensing essentially all of the gaseous phase portion of the admixed stream to form a liquid phase feed stream wherein the liquid phase consists essentially of hydrogen chloride and chloromethanes;
   f. passing essentially all of the condensed liquid phase feed stream to a stripping zone;
   g. maintaining the stripping zone at a pressure above about 150 psia and temperature profile sufficient to retain essentially all of the chloromethanes in a liquid phase and to allow essentially all of the hydrogen chloride to separate in a vapor phase;
   h. removing a first hydrogen chloride product recovery stream consisting of the hydrogen chloride vapor from the stripping zone;
   i. passing the hydrogen chloride product recovery stream into said indirect heat exchange relationship in the third zone to cool the first liquid phase portion;
   j. passing the hydrogen chloride product recovery stream from the third zone to a recovery zone; and
   k. removing a second recovery stream consisting of the chloromethanes liquid phase from the stripping zone; the condensing of essentially all of the gaseous phase portion in step (e) and the stripping above about 150 psia in step (g) allowing stripping at a temperature level substantially preventing any ice and hydrogen chloride hydrate buildup in the stripping zone.

2. A process according to claim 1 wherein the stripping zone is maintained at a pressure of between about 200 psia and about 500 psia.

3. A process according to claim 1 wherein the admixed stream is at a temperature in step (d) between about 50° C and about 500° C and wherein the admixed stream is condensed by cooling to a temperature below about 0° C in the fifth zone.

4. In a process for the recovery of hydrogen chloride from a methyl chloride thermal chlorinator gaseous product stream consisting essentially of from about 5 to about 30% hydrogen chloride and correspondingly from about 95% to about 70% of a chloromethanes mixture consisting essentially of from about 20% to about 60% methyl chloride, from about 20% to about 30% methylene chloride, from about 5% to about 15% chloroform and from about 1% to about 25% carbon tetrachloride, the improvement which comprises the following steps:
   a. in a first zone cooling the gaseous stream to form a first gaseous phase portion and a first liquid phase portion;
   b. passing the first gaseous phase portion and the first liquid phase portion from the first zone to a second zone and in the second zone separating the first gaseous phase portion from the first liquid phase portion;
   c. passing the first liquid phase portion from the second zone to a third zone and in the third zone cooling the first liquid phase portion by passing the first liquid phase portion into indirect heat exchange relationship with a hydrogen chloride product recovery stream;
   d. passing the first liquid phase portion after cooling from the third zone to a fourth zone and admixing the cooled first liquid phase portion with the first gaseous phase portion to form an admixed gaseous phase portion/liquid phase portion stream;
   e. passing the admixed stream from the fourth zone to a fifth zone and condensing essentially all of the gaseous phase portion of the admixed stream to form a liquid phase feed stream wherein the liquid phase consists essentially of hydrogen chloride and chloromethanes;
   f. passing essentially all of the condensed liquid phase feed stream at a temperature between about $-30°$ C and about $-10°$ C at a pressure between about 200 psia and 250 psia to a stripping zone;
   g. maintaining the stripping zone at a pressure between about 200 psia and about 250 psia and at a temperature profile suffficient to retain essentially all of the chloromethanes in a liquid phase and to allow essentially all of the hydrogen chloride to separate in a vapor phase;
   h. removing a first hydrogen chloride product recovery stream consisting of the hydrogen chloride vapor phase from the stripping zone;
   i. passing the hydrogen chloride product recovery stream into said indirect heat exchange relationship in the third zone to cool the first liquid phase portion;
   j. passing the hydrogen chloride product recovery stream from the third zone to a recovery zone; and
   k. removing a second recovery stream consisting of the chloromethanes liquid phase from the stripping zone; the condensing of essentially all of the gaseous phase portion in step (e) and the stripping in step (g) allowing stripping at a temperature level substantially preventing any ice and hydrogen chloride hydrate buildup in the stripping zone.

5. A process according to claim 4 wherein the admixed stream is at a temperature at step (d) between about 50° C and about 100° C and is condensed by cooling to a temperature between about −30° C and about −10° C.

6. A process according to claim 4 wherein the first recovery stream consisting of the hydrogen chloride vapor phase is removed from the stripping zone at a temperature between about −20° C and −10° C.

7. A process according to claim 4 wherein coolant at a temperature of between about −30° C and about −10° C is passed into indirect heat exchange contact with the stripping zone to maintain the temperature profile thereof.

* * * * *